(12) United States Patent
Audi et al.

(10) Patent No.: US 7,625,023 B2
(45) Date of Patent: Dec. 1, 2009

(54) MODULAR ENERGY ABSORBER WITH RIBBED WALL STRUCTURE

(75) Inventors: Richard Francois Audi, Dearborn, MI (US); Ryan Johnson Brooks, Allen Park, MI (US); Joel Matthew Cormier, Ferndale, MI (US); Donald Scott Smith, Commerce Township, MI (US); Michael Anthony Rossi, Grosse Ile, MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 7 days.

(21) Appl. No.: 11/691,516

(22) Filed: Mar. 27, 2007

(65) Prior Publication Data

US 2007/0187961 A1 Aug. 16, 2007

Related U.S. Application Data

(63) Continuation-in-part of application No. 11/014,418, filed on Dec. 16, 2004, now Pat. No. 7,404,593, which is a continuation-in-part of application No. 10/760,760, filed on Jan. 20, 2004, now Pat. No. 7,360,822, which is a continuation of application No. 10/004,739, filed on Dec. 4, 2001, now Pat. No. 6,752,450, which is a continuation-in-part of application No. 09/884,813, filed on Jun. 19, 2001, now Pat. No. 6,682,128, which is a continuation-in-part of application No. 09/499,205, filed on Feb. 7, 2000, now Pat. No. 6,247,745, application No. 10/760,760, which is a continuation-in-part of application No. 09/617,691, filed on Jul. 17, 2000, now Pat. No. 6,679,967.

(51) Int. Cl.
B60R 19/26 (2006.01)

(52) U.S. Cl. .................................................. 293/134

(58) Field of Classification Search ................. 293/102, 293/132, 134; 296/187.03, 1.08
See application file for complete search history.

(56) References Cited

U.S. PATENT DOCUMENTS

| | | | |
|---|---|---|---|
| 6,017,084 A | 1/2000 | Carroll, III et al. | |
| 6,199,942 B1 | 3/2001 | Carroll, III et al. | |
| 6,247,745 B1 | 6/2001 | Carroll, III et al. | |
| 6,315,339 B1* | 11/2001 | Devilliers et al. | 293/132 |
| 6,443,513 B1 | 9/2002 | Glance | |
| 6,547,280 B1* | 4/2003 | Ashmead | 296/187.03 |
| 6,679,967 B1 | 1/2004 | Carroll, III et al. | |
| 6,682,128 B2 | 1/2004 | Carroll, III et al. | |
| 6,752,450 B2 | 6/2004 | Carroll, III et al. | |
| 6,863,322 B2* | 3/2005 | Hunter et al. | 293/120 |
| 7,163,244 B2* | 1/2007 | Meltzer | 293/128 |
| 7,360,822 B2* | 4/2008 | Carroll et al. | 296/187.03 |
| 7,377,577 B2* | 5/2008 | Carroll et al. | 296/187.03 |

(Continued)

*Primary Examiner*—H Gutman
(74) *Attorney, Agent, or Firm*—Brooks Kushman P.C.

(57) ABSTRACT

A modular energy absorber 10 that is tunable. It comprises one or more energy absorbing modules 12. The energy absorbing modules 12 have means for coordinating 14 energy absorbing units 16 of the one or more modules. The means 14 for coordinating position and support the units 16 in relation to each other before and during relative motion between an incident object and the energy absorber. The units 16 are provided with an upper perimeter 22, a lower perimeter 24 and an intermediate wall 26 with stiffening male 36 or female 38 ribs. A method for configuring and for making the modular energy absorber are also disclosed.

24 Claims, 7 Drawing Sheets

U.S. PATENT DOCUMENTS

| | | | |
|---|---|---|---|
| 2002/0070584 A1* | 6/2002 | Carroll et al. | 296/189 |
| 2005/0029837 A1* | 2/2005 | Stehning et al. | 296/214 |
| 2005/0040679 A1* | 2/2005 | Lipke et al. | 296/214 |
| 2006/0066134 A2* | 3/2006 | Carroll et al. | 296/187.03 |
| 2007/0114772 A1* | 5/2007 | Evans | 280/753 |
| 2007/0176439 A1* | 8/2007 | Meltzer | 293/102 |
| 2007/0182170 A1* | 8/2007 | Renault et al. | 293/102 |

* cited by examiner

MODULAR ENERGY ABSORBER WITH RIBBED WALL STRUCTURE

CROSS-REFERENCE TO RELATED APPLICATIONS

This application is a continuation-in-part of U.S. application Ser. No. 11/014,418 filed Dec. 16, 2004 now U.S. Pat. No. 7,404,593, which is a continuation-in-part of U.S. application Ser. No. 10/760,760 filed Jan. 20, 2004 now U.S. Pat. No. 7,360,822, which is a continuation of U.S. application Ser. No. 10/004,739 filed Dec. 4, 2001 (now U.S. Pat. No. 6,752,450), which is a continuation-in-part of U.S. application Ser. No. 09/884,813 filed Jun. 19, 2001 (now U.S. Pat. No. 6,682,128) which is a continuation-in-part of U.S. application Ser. No. 09/499,205 filed Feb. 7, 2000 (now U.S. Pat. No. 6,247,745). Application Ser. No. 10/760,760 is also a continuation-in-part of U.S. application Ser. No. 09/617,691 filed Jul. 17, 2000 (now U.S. Pat. No. 6,679,967). All applications in this paragraph are incorporated by reference herein.

BACKGROUND OF THE INVENTION

1. Field of the Invention

This invention generally relates to vehicle protection and occupant safety during a collision, and more specifically to a rib-reinforced "customized" or "tunable" energy absorber that absorbs energy imparted by an object that impacts the absorber or by a structure to which the absorber is affixed when it impacts an object.

2. Background Art

There are various ways to protect a vehicle and its occupants when the vehicle hits a wall or pedestrian, or an occupant impacts the A and B pillars, headliner, door, knee bolster, or any hard structure during an impact. The absorber may, for example, be positioned in a vehicle headliner, door panel, knee bolster, or bumper, in an A-pillar, B-pillar, or in other locations. Generally, the energy absorber is positioned (e.g., in a bumper or in a headliner) between a vehicle or its occupant and an incident force. It serves to at least partially cushion a blow and thus protect the vehicle or its occupant from severe injury. Illustrative approaches are described in U.S. Pat. No. 6,443,513, which issued on Sep. 3, 2002 to Glance, and in commonly owned U.S. Pat. Nos. 6,247,745; 6,199,942; 6,679,967; 6,682,128; 6,752,450.

Thermoformed energy absorbers as described, for example, in U.S. Pat. Nos. 6,017,084 and 6,752,450 describe geometric variations of thermoformed shapes. These shapes provide dynamic force versus deflection curves that essentially produce a "square wave" relationship of force and deflection.

In these and related approaches, there remains the desire to absorb as much impact energy in as little crush distance as possible, with as little absorber weight as possible, yet be capable of being designed and manufactured under favorable economic conditions.

SUMMARY OF THE INVENTION

One object of the present invention is to provide a more cost effective, efficient energy absorber that can be "customized" or "tuned" to produce predefined energy absorption characteristics within spatial constraints (e.g., between a bumper beam and fascia) that may be imposed by a particular application.

In applications where maximizing the amount of energy absorbed over a given distance is more important than the "square wave" character of the force-deflection curve, an inventive absorber has been developed which has been shown to provide roughly 28% more energy absorption over previous generations. For reasons described herein, the absorber provides more energy absorption capability for a given thickness of material.

Therefore, in instances where the efficiency of the absorber is less important than the amount of energy absorbed, the disclosed design decreases the raw material thickness, product cycle time, component mass, and ultimately the cost of the component when compared to previous approaches.

The properties of this innovation are especially well suited for bumper systems, where increasing the amount of energy absorbed and minimizing intrusion tend to be more important than the response curve of the impacted absorber.

The invention relates to structures that increase the yield point of an absorber and thus protect an underlying component (e.g., a bumper beam) from damage. One embodiment deploys "female" ribs in the side walls of a frustoconical (in one example) structure to prevent it from yielding under a given load.

The invention includes a modular energy absorber with one or more energy absorbing modules (e.g., assemblies of recesses) that are provided with means (e.g., a base) for coordinating energy absorbing units therewithin. As used herein the term "energy absorbing module" means an assembly of energy units that are connected by a common means for coordinating them. The means for coordinating is terminated by a periphery so that within the periphery, the means for coordinating may be planar, curved, or curvilinear. The coordinating means has a flat or curved topography with a variable number (n) of apertures, where n is an integer $\geq 0$. The means for coordinating alternatively includes a web, a tether, a hinge, a planar or curved surface, and wings or combinations thereof that serve to position and support the associated energy absorbing units in a given module in relation to each other before, during and after relative motion between an incident object and the energy absorber. Impact between the energy absorbing units and an incident object results in forces that are at least partially absorbed so that a blow imparted to a vehicle or its occupant is cushioned.

One or more of the energy absorbing modules have energy absorbing units (e.g., recesses) that serve as crushable members with walls. Each member has an upper extremity that defines an upper perimeter, a lower extremity that defines a lower perimeter, and an intermediate section extending therebetween. Either the upper or lower extremities can be presented to the impacting force. One or more male or female ribs (collectively, "ribs") are provided in at least part of the intermediate wall section.

The wall and one or more ribs of an energy absorbing unit at least partially collapse during energy absorption to a crushed configuration. In some embodiments, there is a number (m) of breaches that are defined in the crushable member before impact, where m is an integer $\geq 0$. The breaches, if any, may or may not overlap, underlie, or overlie an associated rib. The breaches may be defined by slits (no material moved) or slots (material removed to form an opening), or both. Thus, within a given energy absorbing module, the means for coordinating may or may not be flat and may or may not have a number (n) of apertures; one or more of the energy absorbing units with one or more ribs in a given unit may be provided with a number (m) of breaches (e.g., slits, or slots, or slits and slots, or neither slits nor slots); and the means for coordinating may be provided with a flat or curved topography before impact.

DETAILED DESCRIPTION OF THE PREFERRED EMBODIMENT(S)

1. The Energy Absorber

Figure 1:
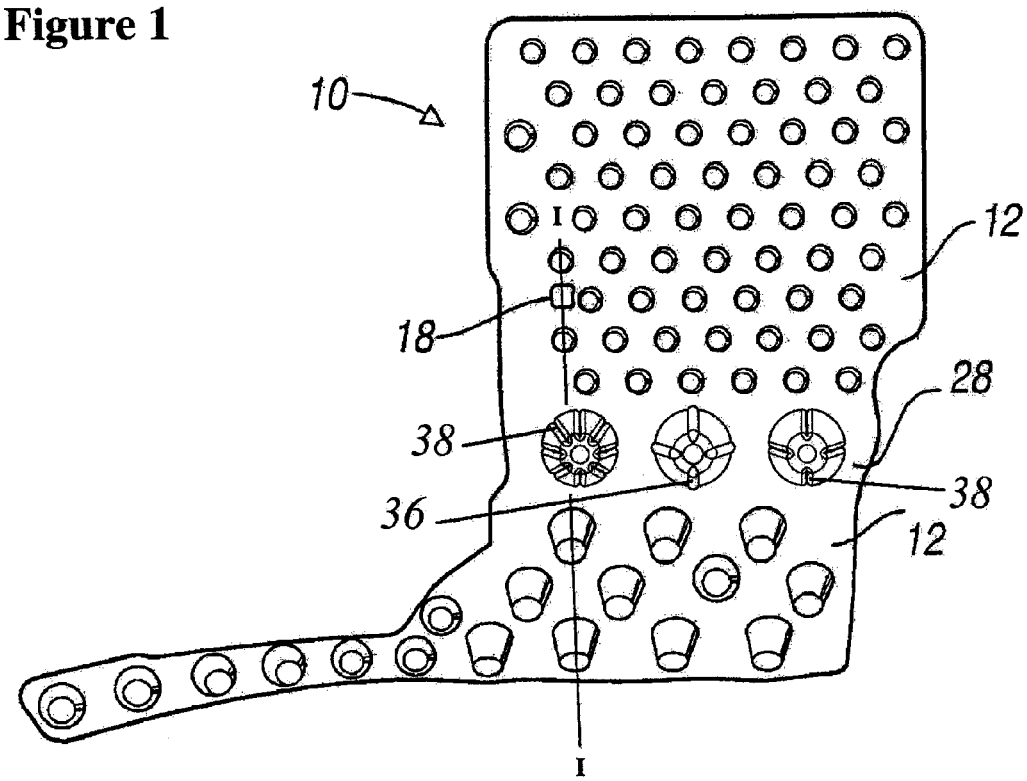
FIG. 1 is a top plan and partial isometric view of a modular energy absorber constructed in accordance with the present invention, in which one of the energy absorbing modules has alternate embodiments of ribs in energy absorbing units that extend from one or more coordinating means.

Turning first to FIG. 1 of the drawings, there is depicted a modular energy absorber or assembly 10 that has one or more (e.g., three in the embodiment depicted) energy absorbing modules 12. The definition of the "energy absorbing module" which appears in the summary section of this application is incorporated here by reference.

Figure 3:
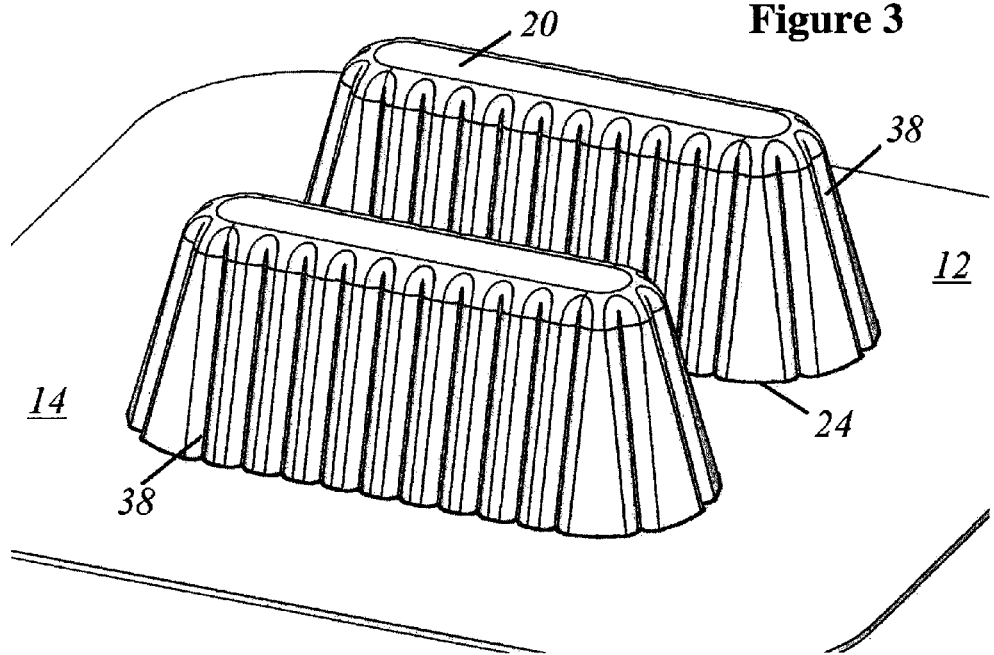
FIG. 3 is an isometric view of a pair of channel-shaped absorbers with ribbed walls.
Figure 5:
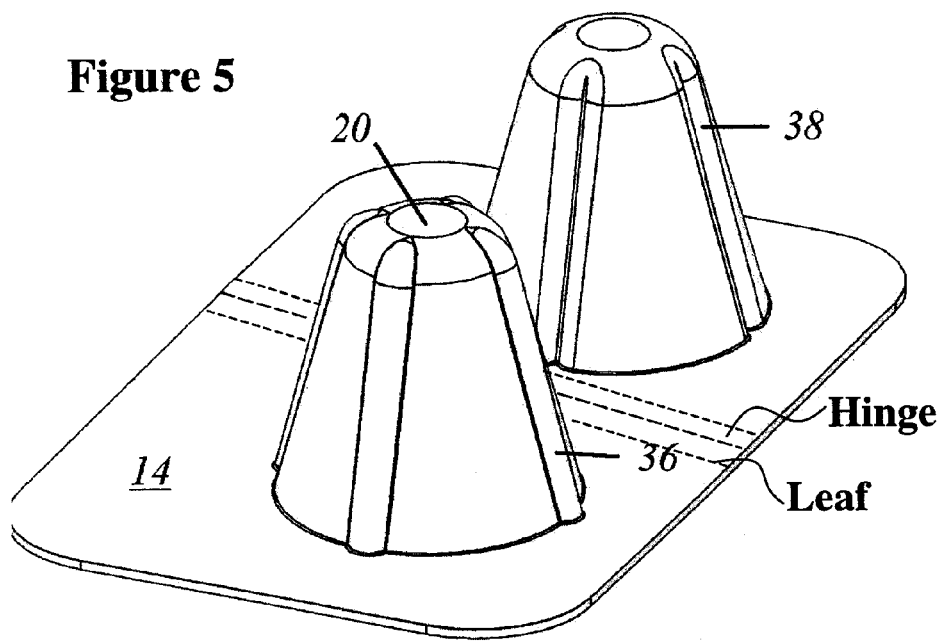
FIG. 5 is an isometric view of a module with a pair of cone-shaped absorbers—one with female ribs and the other with male ribs.

At least some of the one or more modules comprising the assembly include means 14, such as a basal structure, for coordinating energy absorbing units 16 ("absorbers") of a given energy absorbing module 12. The units are further characterized by one or more male 36 (e.g., FIG. 5) or female ribs 38 (e.g., FIGS. 1, 3) in the walls of the units 16, and by certain shapes, dimensions, and wall thicknesses that can be customized or "tuned" using non-linear finite element analysis software to model a desired energy absorber. Additional options for "tuning" a given energy absorbing module is the provision in a given module of energy absorbing units that have no ribs, female ribs, male ribs, or a combination of male and female ribs of different girths, heights, and tapers. Thus, it will be appreciated that the ribs 34 in a given energy absorbing unit may be male 36, female 38, or a combination of male 36 and female 38 ribs.

Figure 2:
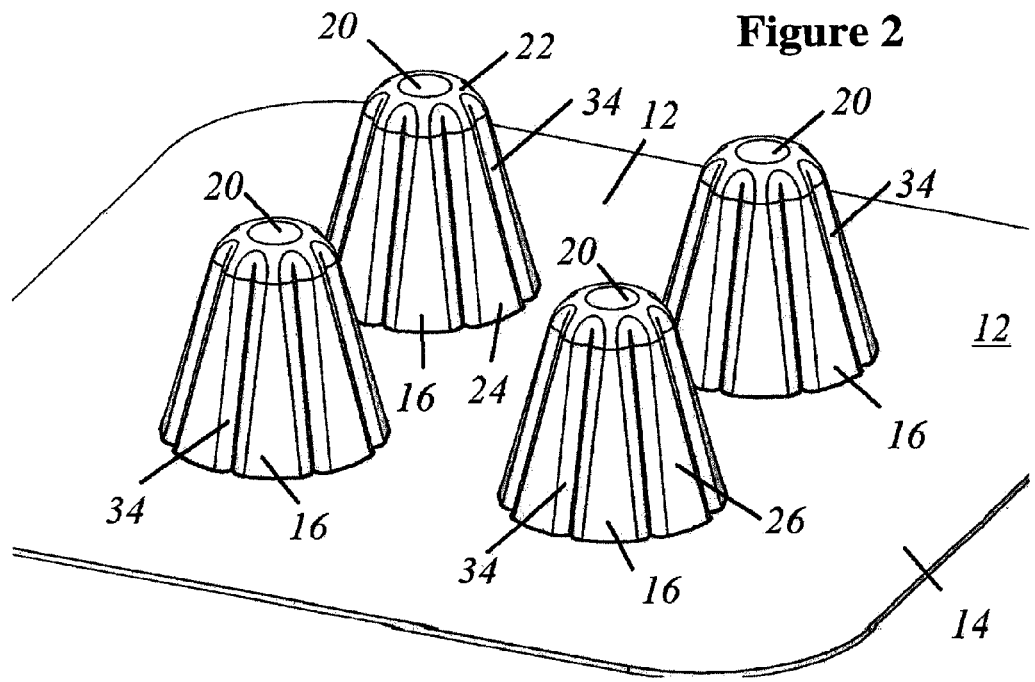
FIG. 2 is an isometric view of a set of cone-shaped absorbers with female ribs.

As shown in FIGS. 1-2, at least some of the energy absorbing units 16 include an upper extremity or perimeter 22, a lower extremity or perimeter 24, and an intermediate section or wall 26 extending therebetween. The intermediate wall 26 defines a number (r) of ribs 34 that extend at least partially between the upper 22 and lower 24 perimeters. Preferably, $6 \leq (r) \leq 8$ in a unit 16. At least some of the ribs 34 associated with an energy absorbing unit 16 run parallel to an axis of symmetry of the unit.

Figure 4:
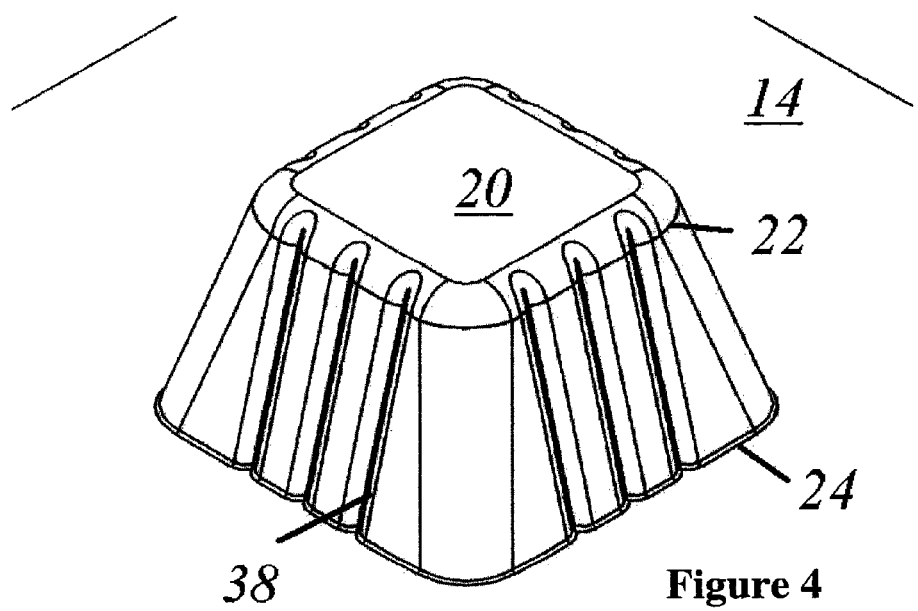
FIG. 4 is an isometric view of a box-shaped absorber provided with ribbed walls.
Figure 7:
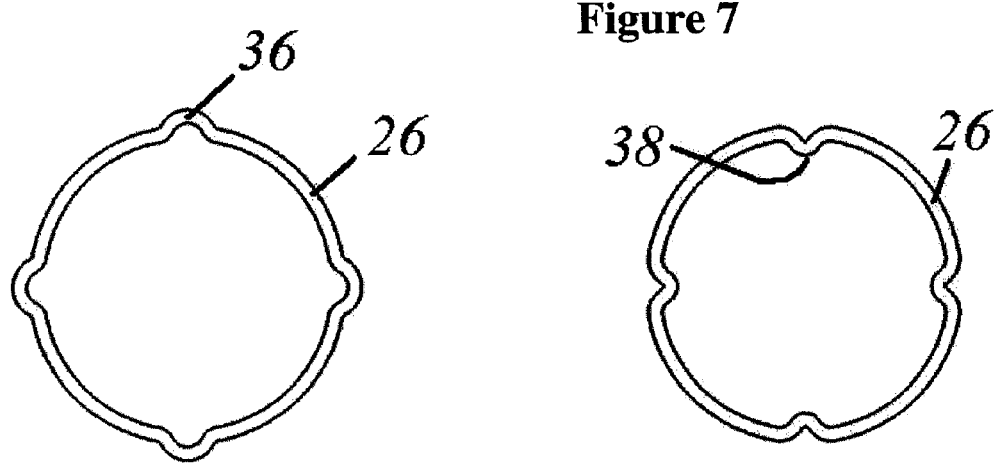
FIG. 7 is a sectional view, taken along the line I of FIG. 6.

As used herein, a "female" rib 38 means a rib that is concave, or forms a trough when viewed from outside the energy absorbing unit 16 (e.g., FIG. 7). A "male" rib 36 means a rib that is convex or forms a ridge when viewed from the outside of a unit. In one embodiment, the energy absorbing units 16 take the form of truncated cones. In another embodiment, at least one energy absorbing unit 16 takes the form of a channel with an oval lower perimeter 24. In another embodiment, the lower perimeter may be rectangular or square with curved corners, as depicted in FIG. 4.

The energy absorbing units 16 coordinate with each other through the provision of coordinating means 14 that position and support the units in relation to each other before and during motion between an incident object (not shown) and the energy absorber 10. That relative motion causes impact between the energy absorbing units 16 and the incident object so that forces resulting therefrom are at least partially absorbed. In this way, the impact forces that are transmitted to a vehicle or to an occupant of a vehicle within which, for example, the modular energy absorber 10 is situated are reduced. Also, the damage to the vehicle and injuries by the occupants sustained may be lessened.

When present, the ribs 34 (e.g., FIG. 4) run mostly parallel to an axis of symmetry of a unit. It will be appreciated that to produce given energy management characteristics, the ribs 34 may vary in both height and width (girth), with longitudinal edges that may be parallel or inclined (e.g., a tapered rib).

If desired, the ribs 34 which protrude inwardly (female ribs, 38) or outwardly (male ribs, 36) from either side of a wall 26 (FIG. 4), can be added or reduced in size to either increase or decrease the crush resistance of the structure ("tuning"). The rib height and width can be varied to increase or decrease crush resistance. In a preferred embodiment, female ribs 38 are provided on the interior of an energy absorbing unit.

In some cases, an energy absorbing unit may have a plurality of ribs 34 that are tapered in a longitudinal direction. In such embodiments, the girth of a given rib may be wider proximate the lower perimeter 24 than proximate the upper perimeter 22, or vice versa.

It will be appreciated that either the lower perimeter 24, the upper perimeter 22, or a portion of an intermediate section 26 may define a geometric figure selected from the group consisting of a circle, an oval, an oblong, an oblate oblong, a polygon, and an ellipse.

Figure 8:
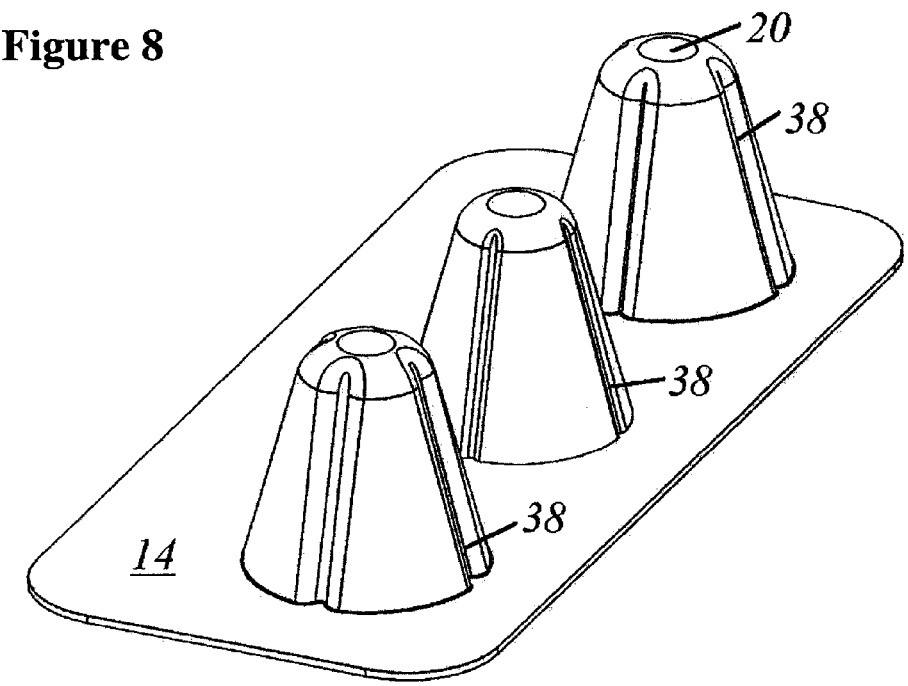
FIG. 8 is an isometric view of an absorbing module with energy absorbing units that have female ribs of varying girths.

The embodiment depicted in FIG. 8 includes energy absorbing units 38 that have domed portions 20 that are located at various heights above the means for coordinating 14.

Figure 11:
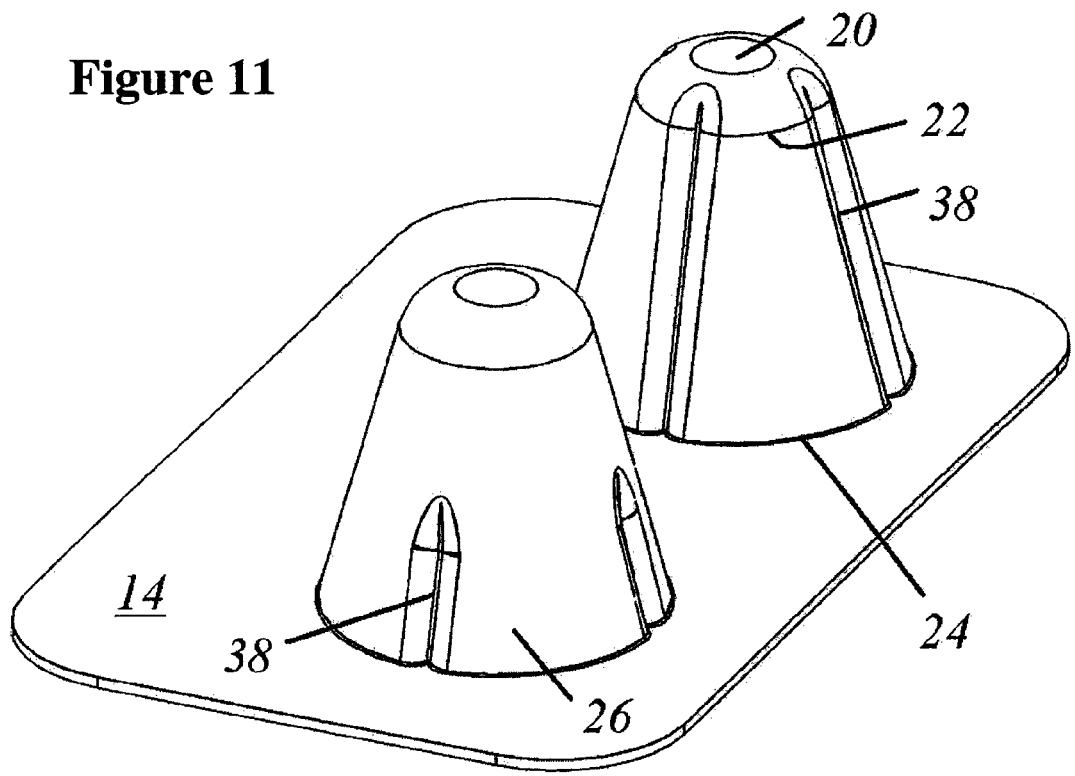
FIG. 11 is an isometric view of a module with absorbers that are provided with female ribs of varying length.
Figure 12:
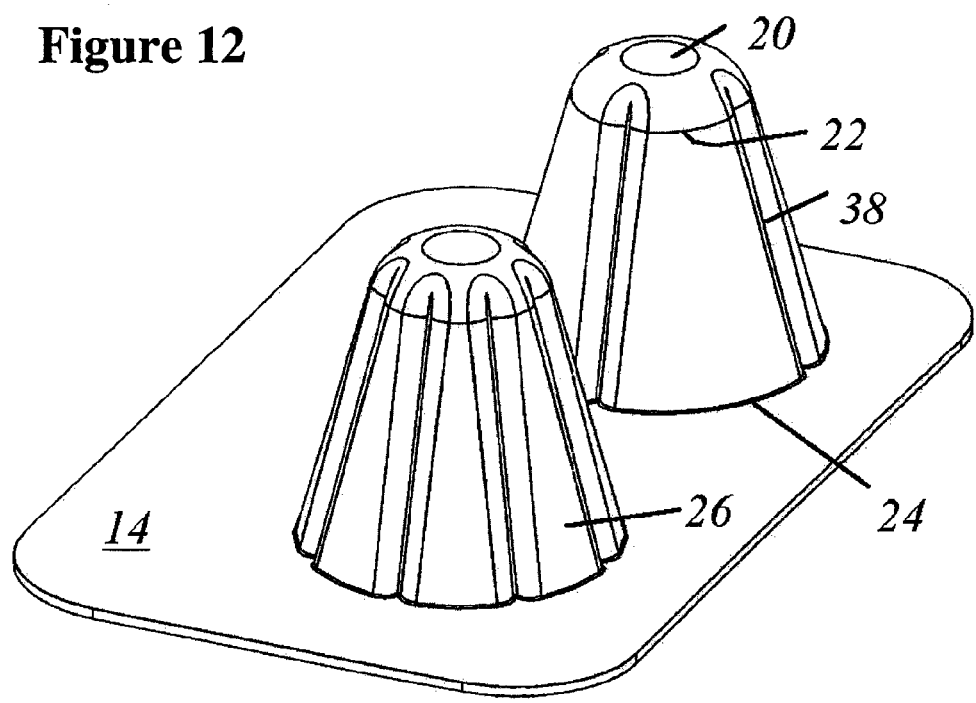
FIG. 12 depicts a further alternative embodiment wherein absorbers are provided with varying members of ribs.

It will be appreciated that the length of a rib 34, such as a female rib 38 (see, FIG. 11) may terminate below the domed portion 20 or make an incursion into the domed portion 20.

Without being bound by any particular theory, it appears that the provision of ribs 34 imbues an energy absorbing unit 16 with stiffening or rigidifying characteristics in the intermediate wall 26. This is in some ways akin to selectively locating I-beams around the wall of a given unit.

It will be appreciated that in some cases, the ribs 34 may be uniformly distributed around a wall 26. In other cases, it may be desirable to have an energy absorbing unit 16 that is stiffer at certain portions of its circumference than at others. If so, it may be that the number of ribs 34 in these desired stiffer portions may exceed the number of ribs in those portions of the periphery which are desired to be less stiff.

In some circumstances, it may be helpful to provide one or more domes 20 that have a non-uniform thickness within a given energy absorbing unit 16.

Figure 6:
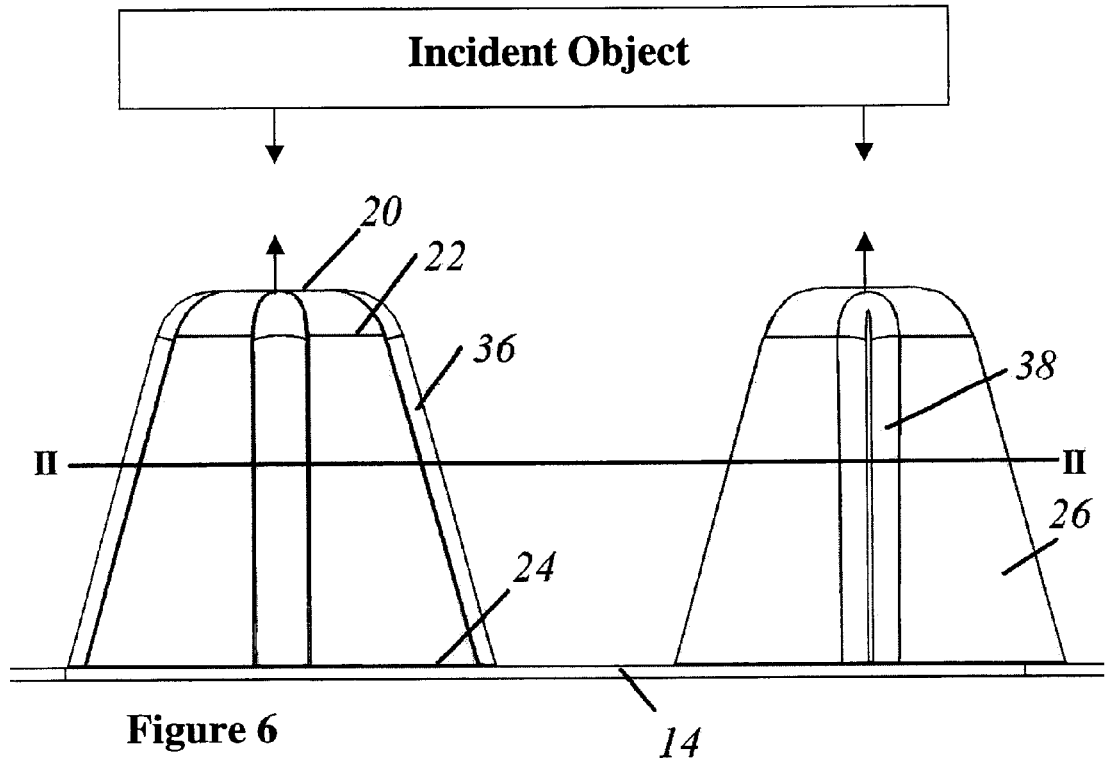
FIG. 6 is a side elevational view of the embodiment depicted in FIG. 5.
Figure 9:
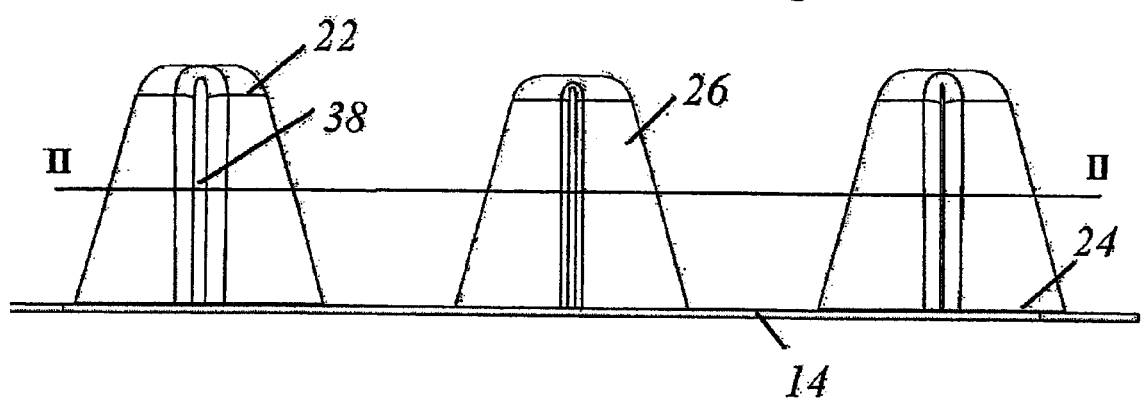
FIG. 9 is a side elevational view of the embodiment depicted in FIG. 8.

For ease of reference, it is sometimes helpful to think of a given rib 34 to be characterized by a girth and a depth at a certain elevation above the means for coordinating 14, such as at a datum line I (FIG. 6) or II (FIG. 9). As used herein, the term "girth" or in (e.g., FIG. 7) refers to a diameter of a rib. The term "dept" refers to the average amount of incursion in the case of a female rib 38 into the perimeter of an intermediate wall 26.

In those regions in which the rib 34 extends into a domed portion 20 (e.g., FIG. 8), it will be appreciated that a transition between the rib and the dome may be thought of as occurring in a shoulder portion of a given energy absorbing unit 16. It will, of course, be understood that in some cases, the rib 38 (FIG. 11) may have a height which is less than the extent of the intermediate wall 26.

Additionally, it will be appreciated that utilization of the present invention, other things being equal, allows taller energy absorbing units 16 to be used where space permits and when it is desired to fill a volume of space in which the absorber is located for any reason.

It will be appreciated that in a given application, a number of energy absorbing modules 12 in an assembly 10 may be affixed to a substrate, such as a bumper beam or fascia. The substrate helps to position and configure energy absorbing modules 12 to suit an application's needs. Another non-limiting example is a headliner that extends across a "B" pillar. The absorber is used, for example, in both pedestrian-friendly and in head and side impact occupant protection applications. In some cases, one or more modular energy absorbers 10 are mounted between the interior trim and the body structure of an automobile, often where space is limited. Designs of specific forms of absorber vary greatly when customizing them to fit and perform within the geometrical environments and constraints into which they are packaged.

As to be described in greater detail herein, the disclosed energy absorbers preferably are made from polymers. Balancing cost, performance and formability, a selection of polypropylene (PPØ) and acrylonitrile butadiene styrene (ABS) material grade can be used. Specifically, these include Basell Polyolefins Pro-fax SV152, Polypropylene Copolymer (SV152), BP Petrochemicals Polypropylene Copolymer 3045, Ammoco 6015 and General Electric Cycolac EX75 (EX75).

In some embodiments, the means for coordinating 14 has a topography that includes a number (n) of apertures 18 defined therein, where n is an integer≧zero. The modular energy absorber 10 is also characterized by energy absorbing units 16 that are connected by coordinating means 14 so that they give resistance and then buckle when impacted with sufficient force.

Additionally, an optional number (m) of breaches 28 may be defined within crushable units 16 before impact. As used in this disclosure, the term "breaches" includes slits and slots. The term "slots" implies an aperture with facing edges which lacks material or from which material has been removed. As used herein, the term "slits" implies a cut or gash that is formed without the removal of material. In the preferred embodiment, the slots are inclined to an axis of symmetry of a given absorber when a crushable unit is presented in the form of a thermoformed frustoconical absorber 16.

In one embodiment, the means for coordinating 14 the energy absorbing units 16 takes the form of a web, a tether, a hinge, a planar surface (as depicted), and rings, or a combination thereof. In some cases, no apertures (n=0) are provided in the energy absorbing coordinating means 14.

It will be appreciated that as a result of "tuning" the energy absorber (e.g., by selecting shape, number and dimensions of male 36 or female ribs 38, dimensional control of wall height, provision of slits or slots or neither, wall thickness, and material selection), energy absorbing characteristics can be pre-selected and the configuration following impact may, if desired, be located in substantially the same position as the pre-impact configuration.

It will be appreciated that the intermediate wall 26 may be characterized by a thickness (t) which may or may not be uniform between a top edge 22 and a lower edge 24 of the wall 26. In some configurations, where particular energy absorbing characteristics are desired or mandated, the wall 26 of a given energy absorbing unit 16 may have an average thickness ($t_1$) that differs from an average thickness ($t_2$) of a wall associated with another energy absorbing unit.

Figure 10:
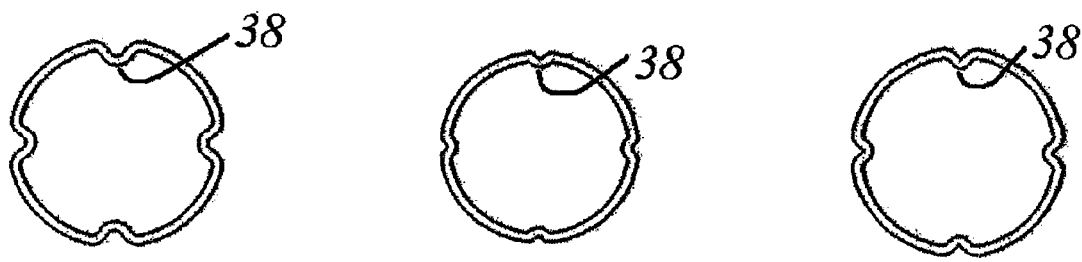
FIG. 10 is a sectional view, taken along the line II of FIG. 9.

With reference to FIGS. 7 and 10, most of a section of the intermediate wall 26 of a given energy absorbing unit 16 may, for example, describe a circle, an oval (e.g., FIG. 3), an oblate oblong or an ellipse. Similarly for the upper perimeter 22 and the lower perimeter 24. Combinations of such shapes among adjacent energy absorbing units 16 are deemed within the scope of the invention.

It will be appreciated that where injection molding is the manufacturing method of choice, slots 31 are the preferred weakening mechanism to be provided in the wall structure 26. Where thermoforming is the manufacturing method of choice, slits are preferred because there is no requirement to remove slugs of unwanted material. Slots tend to weaken the energy absorbing structure, other things being equal, while reducing its weight.

In FIGS. 2-12, there are depicted alternate embodiments of an energy absorber module 12 which have a means for connecting 14 adjacent energy absorbing units 16 (such as a base or basal connecting member) and a plurality of recesses 16 defined extending from the base. At least some of the recesses 16 have a rim or shoulder portion 22, and at least one intermediate wall 26 extending from the rim 22 to the lower perimeter or foot portion 24. The rim 22 may be non-circular (FIG. 3) (termed herein as "curvilinear"). Preferably, the rim 22 has a flat or domed (convex) portion 20, although the rim does not have to be substantially flat. The domed portion 20 may be concave, convex (as shown in FIGS. 2-6, 8-9 and 11-12), or it may be substantially flat.

It will be apparent that in many applications, the energy absorber 10 in any of FIGS. 1-12 may perform satisfactorily in an inverted position.

2. The Manufacturing Method

One preferred (but not exclusive) method of manufacturing is thermoforming. It is known that thermoforming involves stretching a heated plastic sheet of constant thickness over a tool in the shape of the desired part. The stretching step results in a thinning of the sheet and ultimately in a non-uniform thickness distribution within the absorber.

A method for configuring a modular energy absorber comprises the steps of:

a) selecting one or more energy absorbing units according to given spatial constraints and desired energy absorbing criteria;

b) providing a means for coordinating energy absorbing units with a pre-defined contoured topography;

c) locating one or more energy absorbing units in association with the means for coordinating energy absorbing units so that the one or more energy absorbing units are positioned in relation to each other before, during and after relative motion between an incident object and the energy absorber;

d) providing a wall within some of the one or more energy absorbing units so that the wall provides an upper perimeter, a lower perimeter, and an intermediate section with a number (r) of ribs defined thereby extending therebetween;

e) quantifying the resulting modular energy absorbing characteristics of the absorbing structure;

f) comparing the characteristics with those desired; and g) reiterating as necessary.

In many circumstances and applications, following step (f) an absorber's crush resistance can be "tuned" or "dialed up or down" (for example, by providing female ribs) to provide the greatest measure of energy management or the highest level of vehicle or occupant protection for a given set of impact conditions.

Preferably, the disclosed energy absorbers include a structure with recesses in a base sheet and are produced by thermoforming. The recesses, for example, may have a minimum wall thickness of about 1.25 millimeters. Small tapered or drafted areas may have a thickness which is below this thickness.

The walls of the recesses may be thicker than 1.25 millimeters, but may have localized areas that are thinner than 1.25 millimeters to promote buckling of the recess at a given point.

Slits (no material removed), or slots (areas devoid of material) may be provided which run mostly parallel to the wall of a given energy absorbing unit. Such breaches may or may not be present, but when present, the slots may or may not be of varying width. As discussed earlier, ribs 34 that protrude from the interior 38 or exterior 36 of a wall 26 of an energy absorbing unit 16 (e.g., FIG. 4) may or may not be present.

In summary, the crush resistance of each absorber 16 can be varied in order to optimize the impact performance with a minimal impact on tooling cost. The inventive absorber also lends itself to high manufacturing rates and low costs versus current competitive products, while still providing excellent impact performance.

3. Experimental Observations

In general, the disclosed energy absorbing units 16 are evaluated by observing the outputs from the instrumented tests including force versus displacement responses.

Figure 13:
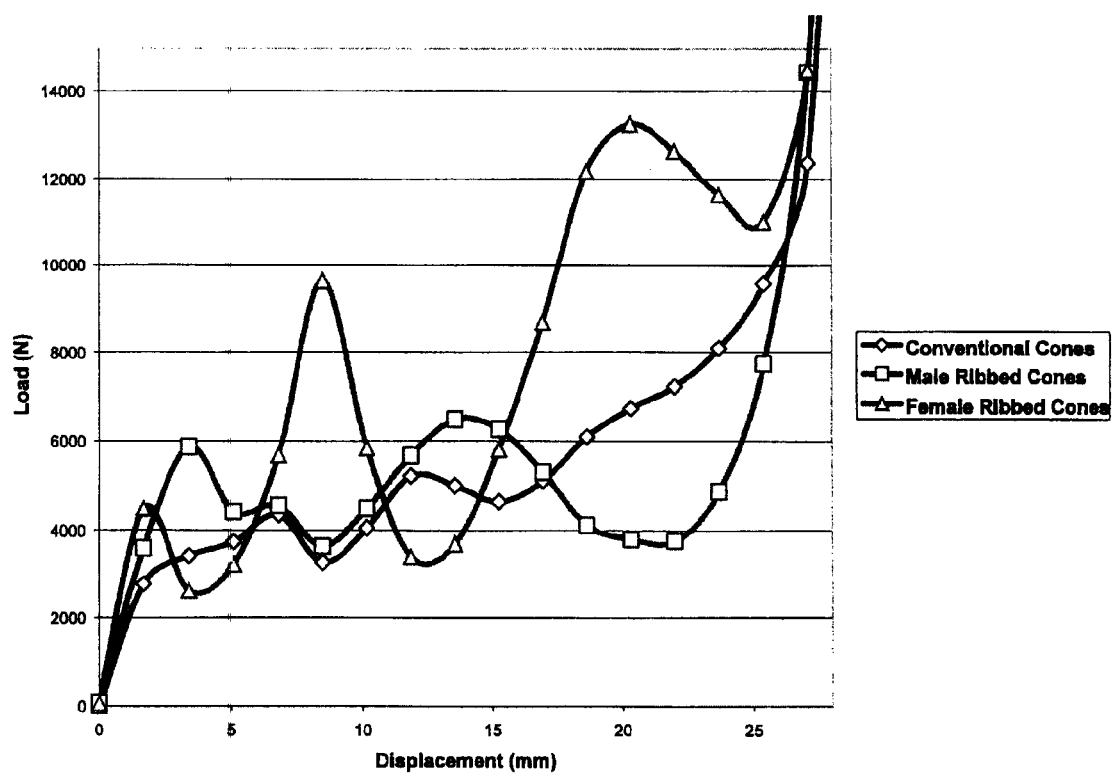
FIG. 13 is a load-displacement graph that compares certain deflection characteristics.

The graph in FIG. 13 compares the conventional cone versus the male ribbed cone 36 to the female ribbed cone 38. The curve of the female ribbed cone 38 has less "square wave" character, but was shown to absorb 28% more energy than the conventional cone.

The force versus deflection curve for "male ribbed cones" has a 109% higher yield point and a more efficient * curve shape, but absorbs 7% less energy than a conventional cone. This may be beneficial in head impact and some side-impact applications where performance is more critical than cost because this embodiment may require an increased material thickness over a conventional cone for a given application.

* An equation commonly used to calculate energy absorbing efficiency is:

Energy Absorbing Efficiency = 
$$\frac{\text{Area under force versus deflection curve}}{\text{Rectangular area with same maximum force and deflection}}$$

The force/deflection curve for "female ribbed cones" has a 64% higher yield point and absorbs 33% more energy, but has a less efficient curve shape* than a conventional cone. This may be beneficial in bumper and some side-impact applications where minimizing deflection (intrusion) and cost are more important drivers than efficiency.

Experimental observations reveal that the resistance characteristics of the energy absorbing units 16 are most sensitive to the number and type of ribs 34. The mean pressure exerted by an energy absorbing module 12 in response to an impacting force can also be tuned by adjusting the spacing between energy absorbing units 16 within practical manufacturing and performance limits. One can therefore optimize the resistance of the module 12 for a given set of impact conditions by changing the design of the units 16 and their spatial orientation within the module 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A modular energy absorber assembly comprising:
   one or more energy absorbing modules, one or more of which having:
   means for coordinating energy absorbing units of the one or more modules, the means for coordinating having a topography; and
   one or more energy absorbing units associated with the means for coordinating, the means for coordinating positioning the one or more units in relation to each other before relative motion between an incident object and the energy absorber, so that impact forces resulting therefrom are at least partially absorbed by the one or more energy absorbing units, one or more of the units including
   an upper perimeter, a lower perimeter and an intermediate wall extending therebetween with one or more ribs defined at least partially in the intermediate wall and extending at least partially between the upper perimeter and the lower perimeter of an associated energy absorbing unit before impact, the intermediate wall at least partially collapsing during energy absorption;
   a domed portion extending from the upper perimeter;
   one or both of the intermediate wall and the domed portion at least partially deforming according to deformation characteristics associated with the intermediate walls, domed portions and ribs;
   wherein one or more of the energy absorbing units are oriented such that their intermediate walls are inclined to a major incident component of the impacting force, wherein the ribs are substantially co-axial with the major incident component of the impacting force and wherein at least one of the energy absorbing units cooperate with each other and the means for coordinating to afford mutual support in decelerating an object that imparts the impacting force.

2. The modular energy absorber assembly of claim 1 wherein the ribs in a given absorbing unit are selected from the group consisting of male, female and male and female ribs.

3. The modular energy absorber assembly of claim 1 wherein at least one of the one or more energy absorbing units includes a plurality of ribs that are tapered in a longitudinal direction.

4. The modular energy absorber assembly of claim 1 wherein one or more of the energy absorbing units is channel-shaped.

5. The modular energy absorber assembly of claim 1 wherein one or more of the energy absorbing units is box-shaped.

6. The modular energy absorber assembly of claim 1, wherein the lower perimeter of one of the one or more energy absorbing units defines a geometric figure that is selected from the group consisting of a circle, an oval, an oblong, an oblate oblong, a polygon, and an ellipse.

7. The modular energy absorber assembly of claim 1, wherein the upper perimeter of one of the one or more energy absorbing units defines a geometric figure that is selected from the group consisting of a circle, an oval, an oblong, an oblate oblong, a polygon, and an ellipse.

8. The modular energy absorber assembly of claim 1, wherein a cross-section of an intermediate wall defines a geometric figure that is selected from the group consisting of a circle, an oval, an oblong, an oblate oblong, a polygon, and an ellipse.

9. The modular energy absorber assembly of claim 1 wherein the ribs associated with one of the one or more energy absorbing units have different girths.

10. The modular energy absorber assembly of claim 1 wherein the ribs associated with one of the one or more energy absorbing units have different depths.

11. The modular energy absorber assembly of claim 1 wherein one or more of the energy absorbing units is provided with four female ribs.

12. The modular energy absorber assembly of claim 1 wherein one or more of the energy absorbing units is provided with four male ribs.

13. The modular energy absorber assembly of claim 1 wherein the one or more energy absorbing units each have an imaginary axis of symmetry and at least a part of the means for coordinating is inclined to the axis of symmetry.

14. The modular energy absorber assembly of claim 1 wherein a released configuration following rebound is located in substantially the same position as a pre-impact undeflected configuration.

15. The modular energy absorber assembly of claim 1 wherein the intermediate wall has a thickness, the thickness being non-uniform between the upper and lower perimeters.

16. The modular energy absorber assembly of claim 1 wherein the domed portion has a thickness, the thickness being non-uniform around the upper perimeter.

17. The modular energy absorber assembly of claim 1 wherein the intermediate wall of the one or more energy absorbing units has an average thickness that differs from an average thickness of a wall associated with another of the one or more energy absorbing units.

18. The modular energy absorber assembly of claim 1 wherein the domed portion of the one or more energy absorbing units has a height that differs from the height of the domed portion of another of the one or more energy absorbing units.

19. The modular energy absorber assembly of claim 13 wherein each axis of symmetry defines positioning loci that intersect a plane, and a line that joins adjacent loci in the plane describes a geometrical figure selected from the group consisting of a segmented line, a circle, an oval, an oblong, an ellipse, a square, a diamond, a quadrilateral, and a polygon.

20. The modular energy absorber assembly of claim 1 further comprising:
a hinge having leaves, each leaf cooperating with the means for coordinating so that the absorber may be configured within spatial constraints imposed by an environment within which the absorber is positioned, the environment being selected from the group consisting of a headliner in a vehicle, a bumper assembly, a knee bolster, and a side-impact location including a vehicle pillar, an armrest, and a door.

21. The modular energy absorber assembly of claim 1 wherein the means for coordinating comprises a form selected from the group consisting of a web, a tether, a hinge, a planar surface, a rib, a channel, a non-planar surface, and combinations thereof.

22. The modular energy absorber assembly of claim 1 wherein the means for coordinating before impact is non-planar.

23. A method for configuring a modular energy absorber assembly according to claim 1 comprising the steps of:
selecting one of the energy absorbing units with one or more ribs according to spatial constraints and desired energy absorbing criteria;
providing a means for coordinating energy absorbing units, the means having a topography;
locating multiple energy absorbing units and the means for coordinating energy absorbing units so that the multiple energy absorbing units are positioned in relation to each other before impact;
determining a wall thickness profile;
deriving theoretical energy absorbing characteristics of the energy absorber assembly;
identifying desired energy absorbing characteristics;
comparing the theoretical energy absorbing characteristics with those desired; and
reiterating as necessary.

24. The method of claim 23 wherein the selecting step comprises selecting one or more ribs with different depths.

* * * * *